3,523,122
NOVEL 5-NITRO-4-THIAZOLIN-2-YLIDENE
COMPOUNDS
David B. Capps, Ann Arbor, Mich., assignor to Parke,
Davis & Company, Detroit, Mich., a corporation of
Michigan
No Drawing. Continuation of application Ser. No.
711,835, Mar. 11, 1968. This application Feb. 3,
1969, Ser. No. 796,219
Int. Cl. C07d 91/18
U.S. Cl. 260—306.7                    10 Claims

ABSTRACT OF THE DISCLOSURE

Novel thiazolinylidene compounds (I) having pharmacological activity are provided by reacting 2-thiazolyl carboxamides (II)

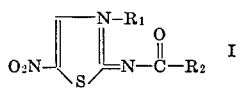  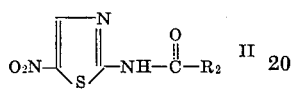

with the compound $R_1X$, by nitration of 5-desnitro thiazolyidene carboxamides (III), and by cleavage of trityl ethers (IV)

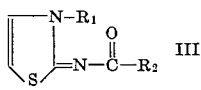  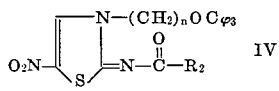

The compounds can be used as schistosomacidal and trichomonacidal agents.

SUMMARY AND DETAILED DESCRIPTION

This application is a continuation of U.S. application Ser. No. 711,835, filed Mar. 11, 1968, now abandoned.

This invention relates to novel 5-nitro-4-thiazolin-2-ylidene compounds having the formula

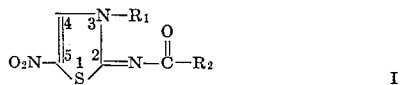

where $R_1$ is $C_2$ to $C_8$ alkyl, methoxy- or ethoxy-substituted $C_1$ to $C_4$ alkyl, ω,ω-dimethoxy-substituted $C_2$ to $C_4$ alkyl, $C_2$ to $C_4$ hydroxyalkyl, propynyl, allyl, benzyl, acetoxyethyl, trifluoroacetoxyethyl, or methylthioethyl, and $R_2$ is methyl, $C_4$ to $C_8$ t-alkyl, $C_4$ to $C_8$ t-chloroalkyl, $C_3$ to $C_5$ cycloalkyl, $C_1$ to $C_3$ 1-alkyl-substituted $C_3$ to $C_5$ cycloalkyl, 1-adamantanyl, 1-phenylcyclopropyl, 1-phenylcyclobutyl, or 1,1-dichloro-substituted $C_1$ to $C_6$ alkyl. For purposes of the invention $R_1$ is preferably isopentyl, n-butyl, 2-methoxyethyl or hydroxyethyl and $R_2$ is t-butyl or cyclopropyl.

According to one embodiment of the invention, the compounds can be produced by reacting a thiazolyl carboxamide of formula

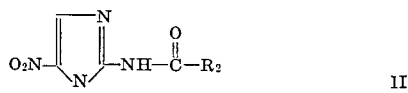

with a compound $R_1X$ in the presence of base, where $R_1$ and $R_2$ are as specified above and X is a halide, sulfate, alkylsulfonate or aryl sulfonate group. The reaction is carried out in the presence of a base such as an alkali metal hydride, amide or alkoxide. Sodium hydride is a preferred base for the reaction. Also, the reaction is carried out in the presence of an unreactive solvent such as a tertiary amide (N,N-dimethylformamide, N,N-dimethylacetamide or N-methyl-2-pyrrolidone), an ether (diethyl ether, dioxane, tetrahydrofuran, diethylene glycol dimethyl ether or dimethyl sulfoxide) or a mixture of such solvents. In general, aprotic solvents are preferred, particularly N,N-dimethylformamide and tetrahydrofuran. Equimolar quantities of the reactants may be used although it is preferable to use a slight excess of the reagent $R_1X$ and of the base. The time and temperature for the reaction are not critical and may be varied over a considerable range. In general, the temperature range from 0–150° C. is satisfactory at which temperatures the reaction ordinarily is complete within about 1 to 48 hours. The desired product can be isolated from the reaction by extraction with a suitable solvent (for example, toluene) and by removal of the solvent from the extract. Alternatively, the product may be precipitated from the reaction mixture by dilution with water. Other means of isolation may also be used.

According to another embodiment of the invention the products can be produced by reacting 5-desnitro-4-thiazolin-2-ylidene carboxamides of formula

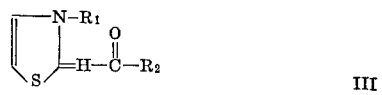

with a nitrating agent, where $R_1$ and $R_2$ are as specified above. The preferred nitrating agent is fuming nitric acid in sulfuric acid. The sulfuric acid functions as a solvent. Additional solvent is neither required nor desirable. Equimolar quantities of the carboxamide starting material and nitrating agent can be employed although it is preferable to use a slight to moderate excess of the nitrating agent up to about 10%. Larger excesses are undesirable. The reaction proceeds at a satisfactory rate at relatively low temperatures and is exothermic. External heating is not required. In general, the reaction is carried out at temperatures ranging from about −20 to 40° C. for periods ranging from about 15 minutes to 4 hours. According to a preferred practice, the nitric acid is added to a solution of the carboxamide in concentrated sulfuric acid, and the temperature of the reaction medium is maintained from about 0 to 10° C. The product can be obtained in solid form by pouring the reaction mixture into water and filtering the resulting suspension. Alternatively, the product can be extracted from the reaction mixture with a suitable solvent and can be isolated from the extract as the residue remaining after solvent removal.

According to still another embodiment of the invention, the compounds where $R_1$ is hydroxyalkyl can be produced by reacting a trityl ether of formula

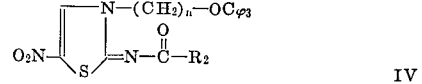

with an acidic reagent, where $n$ is the integer 2, 3 or 4 and $R_2$ is as specified above. For the reaction any of various acidic reagents capable of cleaving ethers can be employed. These reagents include mineral acids, aluminum chloride, boron tribromide, pyridine hydrochloride, aqueous lower alkanoic acids and similar reagents. Preferably, a mild acidic reagent is employed such as aqueous lower alkanoic acid, especially aqueous acetic acid and for best results 80% aqueous acetic acid. When using aqueous acetic acid as the cleaving agent, additional solvent is unnecessary and in fact undesirable. The time and temperature for the reaction are in general not critical. When using 80% aqueous acetic acid, reaction temperatures ranging from about 25–100° C. for periods from 1 to 24 hours are suitable, preferably temperatures from 75–100° C. for 1 to 4 hours. The acidic reagent is ordinarily employed in large excess. The product is conveniently isolated from the reaction mixture by cooling, filtering and diluting the filtrate to cause the desired product to precipitate out for collection. Alternatively, the filtrate can be evaporated to provide the product as a residue. Other isolation procedures may also be used.

In the detailed examples which follow, specific descriptions are given of the preparation of starting materials for each of the above described processes of the invention. These descriptions, as will be realized, have general application. Thus, the 2-thiazoyl carboxamides of Formula II are prepared by reacting 2-amino-5-nitrothiazole and the corresponding acid chloride $R_2COCl$ in the presence of tertiary amine; the 5-desnitro thiazolinylidene carboxamides of Formula II are prepared by reacting first 2-aminothiazole and the reactive derivative $R_1X$, and then the resulting 2-amino-4-thiazoline and the appropriate acid chloride $R_2COCl$ in the presence of tertiary amine; the trityl ethers of Formula IV are prepared by reacting a non-aqueous solution of 2-thiazolyl carboxamide of Formula II and sodium hydride with the haloalkylether $Cl(CH_2)_n$—$OCO\varphi_3$; the terms $R_1$, $R_2$, X and n are as specified above.

The compounds of the invention possess valuable pharmacological properties. Significantly, they have antischistosomal and antitrichomonal activity. In particular, the compounds, like the known agent lucanthone hydrochloride, are cidal at low concentration against the species *Schistosoma mansoni* according to standard assay procedures. The details of the assay are as follows:

Female CF-1 mice weighing 13–15 grams each are infected intraperitoneally with 60 cercariae (*S. mansoni* Puerto Rican strain from the snail host *Australorbis glabratus*) 6 weeks prior to treatment. The experimental groups consist of about 5–10 mice while the sham-dosed control groups number about 10–15 mice per experiment. All of the mice are fed Rockland mouse food from the time of infection to autopsy. The test compounds are administered according to one assay procedure in the diet, in another procedure by gavage. Following treatment for a measured period, the animals are killed, autopsied, and the activity of the test compound evaluated by measuring the distribution and number of living and dead worms in the liver, in the portal veins, and in the mesenteric veins. This activity is expressed in terms of percentage of schistosomes found killed after the period of treatment at the selected dosage level. The dosage is given either as a percentage of the compound in the diet or when by gavage as the mg. of compound per kg. of body weight per day of treatment. The activities of some preferred compounds of the invention, as determined by these procedures, are shown in the accompanying table. The compounds in the table are identified by reference to the particular examples that follow showing the preparation of the compounds.

SCHISTOSOMACIDAL ACTIVITY

| Compound | Percent Schistosomes Dead at— | |
|---|---|---|
| | Percent Mouse Diet for Number of Days | Gavage Dose (mg./kg./day) for 5 Days |
| Example: | | |
| 1a | 93/0.25/14 | 98/200 |
| 1c | 100/0.25/14 | 76/200 |
| 2a | 96/0.25/7<br>0.063/7 | 100/200 |
| 2b | 100/0.25/7<br>0.063/7 | 93/100 |
| 2c | 98/0.25/7<br>0.063/7 | 100/100 |
| 2g | 100/0.25/14 | 97/100 |
| 9b | 51/0.125/14 | 92/200 |

The compounds of the invention, like the known agent furazolidine, are cidal at low concentration (i.e., about 25 gamma per ml. or lower) against trichomonads by standard assay (for which the general procedures are described in Trussel's *Trichomonas vaginalis* and Trichomoniasis, page 54 and elsewhere, Thomas, Springfield, Illinois, 1947 and also in Antibiotics and Chemotherapy, 9, 611). Hence, the compounds can be used as schistosomacidal and trichomonacidal agents. For these purposes the compounds in conventional formulation can be used topically or by the oral or parenteral routes.

For schistosomacidal and trichomonacidal use the preferred compounds are:

N-(5-nitro-3-propyl-4-thiazolin-2-ylidene)cyclopropanecarboxamide

N-(3-butyl-5-nitro-4-thiazolin-2-ylidene)cyclopropanecarboxamide

N-[3-(2-hydroxyethyl)-5-nitro-4-thiazolin-2-ylidene]cyclopropanecarboxamide

N-[3-(2-methoxyethyl)-5-nitro-4-thiazolin-2-ylidene]cyclopropanecarboxamide

N-[3-isopentyl-5-nitro-4-thiazolin-2-ylidene]cyclopropanecarboxamide

N-[3-(2-methoxyethyl)-5-nitro-4-thiazolin-2-ylidene]-2,2-dimethylpropionamide

The invention is illustrated by the following examples.

EXAMPLE 1

(a) A 57% dispersion of sodium hydride (9.25 g.) in mineral oil is added to a stirred solution of 2,2-dimethyl-N-(5-nitro-2-thiazolyl)propionamide (45.8 g.) in N,N-dimethylformamide (130 ml.) maintained at 5–10° C. The resulting solution is warmed to 80° C. and 55.8 g. of 2-methoxyethyl-p-toluenesulfonate is added slowly. After the addition is complete, the mixture is stirred and heated at 80° C. for 30 minutes and is then allowed to stand overnight at room temperature. The reaction mixture is treated with glacial acetic acid (1.2 ml.), diluted with toluene and the toluene solution washed with portions of water. The toluene solution is dried, concentrated under reduced pressure and the residual product N-[3-(2-methoxyethyl) - 5 - nitro-4-thiazolin-2-ylidene]-2,2-dimethylpropionamide washed with isooctane; M.P. 99–101.5° C. after recrystallization from 2-propanol.

In a similar manner but starting with an organic halide in place of the alkoxyalkyl p-toluene sulfonate, the following 3-alkyl thiazolinylidene propionamide compounds are obtained:

| Organic Halide, $R_1X$ | | Product |
|---|---|---|
| b | Ethyl iodide | N-(3-ethyl-5-nitro-4-thiazolin-2-ylidene)-2,2-dimethylpropionamide, M.P. 62–63.5° C. from 2-propanol. |
| c | 1-iodobutane | N-(3-butyl-5-nitro-4-thiazolin-2-ylidene)-2,2-dimethylpropionamide, M.P. 74–75° C. from cyclohexane. |
| d | 2-chloroethyl methyl sulfide | 2,2-dimethyl-N-{3-[2-(methylthio)-ethyl]-5-nitro-4-thiazolin-2-ylidene}propionamide, M.P. 74.5–76° C. after recrystallization from 2-propanol. |
| e | 1-iodo-3,3-dimethylbutane | N-[3-(3,3-dimethylbutyl)-5-nitro-4-thiazolin-2-ylidene]2,2-dimethylpropionamide, M.P. 77–78° C. after recrystallization from isooctane. |
| f | 3-bromo-1-propyne | 2,2-dimethy-N-[5-nitro-3-(2-propynyl)-4-thiazolin-2-ylidene]-propionamide, M.P. 100–102° C. from cyclohexane. |
| g | Benzyl chloride | N-(3-benzyl-5-nitro-4-thiazolin-2-ylidene)-2,2-dimethylpropionamide, M.P. 137–138° C. from toluenecyclohexane. |

(h) Trimethylacetyl chloride (25.3 g.) is added to a chilled, stirred suspension of 2-amino-5-nitrothiazole (29.0 g.) and pyridine (16.6 g.) in 150 ml. of tetrahydrofuran. The reaction mixture is heated to 50° C., 100 ml. of acetonitrile is added and the solution is cooled to room temperature and poured into ice water. The resulting product which separates, 2,2-dimethyl-N-(5-nitro-2-thiazolyl)propionamide, is collected, washed with water and dried; M.P. 136–138° C. after recrystallization from ethanol and from benzene.

EXAMPLE 2

(a) A 57% dispersion of sodium hydride (4.6 g.) in mineral oil is added to a stirred solution of N-(5-nitro-2-thiazolyl)cyclopropanecarboxamide (21.3 g.) in 130 ml. of N,N-dimethylformamide maintained at 5–10° C. The resulting solution is warmed to 80° C. and 2-methoxyethyl-p-toluene-sulfonate (27.9 g.) is added slowly. After the addition is complete, the mixture is stirred and heated at 80° C. for one-half hour and is then allowed to stand overnight. The product is isolated according to the procedure of Example 1. This product is N-[3-(2-methoxyethyl)-5-nitro-4-thiazolin-2-ylidene] - cyclopropanecarboxamide; M.P. 109–111° C. after recrystallization from toluene. By this procedure but starting with 2-acetamido-5-nitrothiazole (46 g.) and the hydride (6.45 g.) and the p-tosyl compound (68.5 g.), the product is N-[3-(2-methoxyethyl)-5-nitro-4-thiazolin - 2 - ylidene]acetamide; M.P. 125–127° C. from benzene.

In a manner corresponding products are obtianed employing an organic halide in place of the alkoxyalkyl-p-toluene sulfonate of the foregoing procedure, as follows:

| Organic Halide, R₁X | | Product |
| --- | --- | --- |
| b | 1-iodopropane | N-(5-nitro-3-propyl-4-thiazolin-2-ylidene) cyclopropanecarboxamide, M.P. 115–118° C. from toluene. |
| c | 1-iodobutane | N-(3-butyl-5-nitro-4-thiazolin-2-ylidene) cyclopropanecarboxamide, M.P. 108–109.5° C. from 2-propanol. |
| d | 1-iodopentane | N-(5-nitro-3-pentyl-4-thiazolin-2-ylidene) cyclopropanecarboxamide, M.P. 81–84° C. from methanol. |
| e | 4-bromo-1-butene | N-[3-(3-butenyl)-5-nitro-4-thiazolin-2-ylidene] cyclopropanecarboxamide, M.P. 103.5–105.5° C. from toluene. |
| f | 1-iodo-2-methylpropane. | N-(3-isobutyl-5-nitro-4-thiazolin-2-ylidene) cyclopropanecarboxamide, M.P. 110–112° C. from toluene. |
| g | 1-bromo-3-methylbutane. | N-[3-isopentyl-5-nitro-4-thiazolin-2-ylidene] cyclopropanecarboxamide, M.P. 100–102° C. from toluene. |
| h | 2-bromoethyl ethyl ether. | N-[3-(2-ethoxyethyl)-5-nitro-4-thiazolin-2-ylidene]cyclopropanecarboxamide, M.P. 112–114° C. from 2-propanol. |
| i | 1-iodo-3,3-dimethylbutane. | N-[3-(3,3-dimethylbutyl)-5-nitro-4-thiazolin-2-ylidene]cyclopropanecarboxamide, M.P. 147.5–149.5° C. from toluenecyclohexanane. |
| j | 1-iodohexane | N-(3-hexyl-5-nitro-4-thiazolin-2-ylidene) cyclopropanecarboxamide, M.P. 54–56° C. from 2-propanol. |
| k | Ethyl iodide | N-(3-ethyl-5-nitro-4-thiazoline-2-ylidene) cyclopropanecarboxamide, M.P. 140–142° C. from 2-propanol. |

(1) The starting material for the procedure of 2(a) is prepared as follows:

With stirring and external cooling to maintain the temperature at 3–7° C., a solution of cyclopropanecarbonyl chloride (12.5 g.) in 50 ml. of acetone is added over a period of 15 minutes to a solution of 2-amino-5-nitrothiazole (14.5 g.) and pyridine (9.7 ml.) in 70 ml. of N,N-dimethylformamide. The resulting mixture is allowed to warm to room temperature over a period of one hour and is then poured into 1.5 liters of ice water. The insoluble product is collected on a filter, washed with water and dried. The product is N-(5-nitro-2-thiazolyl)cyclopropanecarboxamide; M.P. 235–237° C. from ethyl acetate-isooctane.

EXAMPLE 3

(a) By following the procedure according to Example 1(a) but using 1-methyl-N-(5-nitro-2-thiazolyl)-cyclopropanecarboxamide (5.68 g.), a 55% dispersion of sodium hydride (1.2 g.) in mineral oil and 2-methoxyethyl-p-toluene sulfonate (7.0 g.), the product obtained is N-[3-(2-methoxyethyl)-5-nitro-4-thiazolin-2-ylidene]-1-methylcyclopropane-carboxamide; M.P. 109.5–110.5° C. from toluenecyclohexane.

(b) The carboxamide starting material for the procedure of paragraph (a) can be prepared as follows:

Oxalyl chloride (50.0 g.) is added dropwise to a stirred solution of 1-methylcyclopropanecarboxylic acid (15.1 g.) [Monatsh. 42, 227–44 (1921)] and pyridine (0.1 ml.) in 60 ml. of benzene. The mixture is held overnight, concentrated to a volume of 25 ml. by distillation and diluted to 100 ml. volume with tetrahydrofuran. This solution and a solution of 16.2 g. of triethylamine in 100 ml. of tetrahydrofuran are added simultaneously over a period of 1.5 hours to a solution of 2-amino-5-nitrothiazole (22.0 g.) in 250 ml. of tetrahydrofuran. The mixture is filtered and the filtrate poured into 800 ml. of ice and water. The solid product is taken up in chloroform and purified by passage over a silica gel column. This product is 1-methyl-N-(5-nitro-2-thiazolyl)-cyclopropanecarboxamide; M.P. 173–175° C. from 95% ethanol.

EXAMPLE 4

(a) Following the procedure of Example 1(a) but using N - (5 - nitro-2-thiazolyl)-1-phenylcyclopropanecarboxamide (35.0 g.) a 55% dispersion of sodium hydroxde (5.8 g.) in mineral oil and n-butyl iodide (26.7 g.), the product obtained is N-[3-butyl-5-nitro-4-thiazolin-2-ylidene]-1-phenylcyclopropanecarboxamide; M.P. 117–119° C. from 2-propanol.

(b) The carboxamide starting material for the procedure of paragraph (a) is prepared as follows: 1-phenylcyclopropanecarboxylic acid chloride (37.9 g.) [J. Org. Chem., 24, 616–20 (1959)] is added dropwise to a stirred solution of 2-amino-5-nitrothiazole (27.6 g.) and pyridine (16.6 g.) in 150 ml. of tetrahydrofuran maintained at 0–5° C. After the addition, the cooling bath is removed, the mixture is stirred several hours at room temperature and 200 ml. of acetonitrile is added. The resulting solution is concentrated under reduced pressure and poured into 3 liters of ice and water. The resulting precipitate is collected, washed with water, dried and recrystallized from ethanol. The product is N-(5-nitro - 2 - thiazolyl) - 1 - phenylcyclopropanecarboxamide; M.P. 141–143° C.

EXAMPLE 5

(a) By the procedure described in Example 1(a) but using N - (5-nitro - 2 - thiazolyl)cyclobutanecarboxamide (35.2 g.), a 57% dispersion of sodium hydroxide (7.15 g.) in mineral oil, 2-methoxyethyl-p-toluenesulfonate (43.2 g.) and 100 ml. of N,N-dimethylformamide, the product obtained is N-[3-(2-methoxyethyl)-5-nitro-4-thiazolin - 2 - ylidene]cyclobutanecarboxamide; M.P. 70–72° C. from 2-propanol.

(b) The carboxamide starting material for the procedure of paragraph (a) can be obtained as follows: A solution is prepared by dissolving 14.3 g. of 2-amino-5-nitrothiazole and 9.0 ml. of pyridine in 70 ml. of dimethylformamide. The solution is stirred and cooled, and a solution of 12.3 g. of cyclobutanecarbonyl chloride in 50 ml. of acetone is added over a period of 20 minutes at 3–7° C. The resulting mixture is allowed to warm to room temperature over a period of one hour and is then poured into 1.5 liters of ice water. The insoluble product is collected on a filter, washed with water and dried. This product is N-(5-nitro-2-thiazolyl) cyclobutanecarboxamide; M.P. 200–203° C. from ethyl acetate-isooctane.

EXAMPLE 6

(a) Following the procedure according to Example 1(a) but using N-(5-nitro-2-thiazolyl)cyclopentanecarboxamide (15.0 g.), a 57% dispersion of sodium hydride (2.86 g.) in mineral oil, ethyl iodide (14.5 g.) and 65 ml. of N,N-dimethylformamide, the product obtained is N - (3-ethyl-5-nitro-4-thiazolin-2-ylidene)cyclopentanecarboxamide; M.P. 80–81° C. from 95% ethanol.

(b) The carboxamide starting material for the procedure of paragraph (a) can be prepared according to the procedure described in Example 5(b) using instead 2-amino-5-nitrothiazole (29.0 g.), pyridine (17.4 g.) and cyclopentanecarboxylic acid chloride (28.2 g.). The product is N-(5-nitro-2-thiazolyl)cyclopentanecarboxamide; M.P. 207–209° C. from ethyl acetate-isooctane.

EXAMPLE 7

(a) By following the procedure according to Example 1(a) but using N-(5-nitro-2-thiazolyl)-1-adamantanecarboxamide (17.7 g.), a 57% dispersion of sodium hydride (2.67 g.) in mineral oil, and 2-methoxyethyl-p-toluenesulfonate (15.9 g.), the product obtained is N-[3-(2 - methoxyethyl) - 5 - nitro - 4 - thiazolin-2-ylidene]-1-adamantanecarboxamide; M.P. 116–118° C. from 2-propanol.

(b) 1-adamantanecarboxylic acid chloride (25 g.) is added to a solution of 2-amino-5-nitrothiazole (16.6 g.) and pyridine (9.95 g.) in 95% ml. of tetrahydrofuran. The reaction mixture is heated to 50° C. and 85 ml. of acetonitrile is added. After standing overnight at room temperature, the mixture is filtered and the product which precipitates is washed with water and dried. This product is N-(5-nitro-2-thiazolyl)-1-adamantanecarboxamide; M.P. 174–176° C. from ethanol.

EXAMPLE 8

(a) A 55% dispersion of sodium hydride (2.64 g.) in mineral oil is added to a stirred solution of 2,2-dimethyl-N-(5-nitro-2-thiazolyl)butyramide (14.4 g.) in 30 ml. of N,N-dimethylformamide. The resulting solution is heated to 80° C. and 1-iodobutane (13.1 g.) is added slowly. The mixture is allowed to cool and stand overnight and is then diluted with toluene. The toluene solution is washed with water, dried and evaporated under vacuum. The residual product is washed with isooctane, taken up in ethanol and the solution cooled to −60° C. The solid product which separates is N-(3-butyl-5-nitro-4-thiazolin-2-ylidene)-2,2-dimethylbutyramide; M.P. 39–40.5° C. after recrystallization from isooctane.

By a similar procedure using allyl bromide (14.5 g.), 2,2-dimethyl - N -(5- nitro-2-thiazolyl)propionamide and sodium hydride (4.8 g.), the product is N-(3-allyl-5-nitro-4-thiazolin-2-ylidene) - 2,2 - dimethylpropionamide; M.P. 40–42° C. from ethanol. Also, using the propionamide (19.0 g.), hydride (4.98 g.) and 10.5 g. of chloromethyl methyl ether, the product is N-[3-(methoxymethyl) - 5 - nitro - 4 - thiazolin-2-ylidene]-2,2-dimethylpropionamide; M.P. 56–58° C. from isopropanol.

The product starting from the propionamide and 4-bromobutyl methyl ether (20.0 g.) is N-[3-(4-methoxybutyl) - 5 - nitro-4-thiazolin-2-ylidene]-2,2-dimethylpropionamide; M.P. 55–57° C. from cyclohexane.

(b) The butyramide starting material for the procedure of paragraph (a) can be prepared as follows: thionyl chloride (33.3 g.) is added dropwise to a solution of 2,2-dimethylbutyric acid (31.9 g.) in 100 ml. of chloroform. The mixture is allowed to stand overnight and heated under reflux for several hours. The solvent is removed under reduced pressure and the residue, combined with 32.4 g. of 2-amino-5-nitrothiazole and 21.6 g. of pyridine is processed according to the procedure of Example 1(f). The amide product obtained is 2,2-dimethyl - N - (5-nitro-2-thiazolyl)butyramide; M.P. 111–113.5° C. from ethyl acetate-isooctane.

EXAMPLE 9

(a) A 55% dispersion of sodium hydride (4.8 g.) in mineral oil is added to a stirred solution of 2,2-dimethyl-N-(5-nitro-2-thiazolyl)propionamide (22.9 g.) in 50 ml. of N,N-dimethylformamide maintained at 5–10° C. The resulting solution is treated with 18.7 g. of 2-bromoethanol, stirred overnight and then heated to 90° C. over 1.5 hours. Toluene (400 ml.) is added and the solution is washed with water, dried and evaporated to a solid residue under reduced pressure. The residual product, N - [3 - (2 - hyroxyethyl)-5-nitro-4-thiazolin-2-ylidene]-2,2-dimethylpropionamide, is washed with isooctane and recrystallized from 2-propanol; M.P. 138–140° C.

By the foregoing procedure but using chloromethyl ethyl ether (11.3 g.) in place of bromoethanol, the product is N - [3 - (ethoxymethyl)-5-nitro-4-thiazolin-2-ylidene]-2,2-dimethylpropionamide; M.P. 75–77° C. from 2-propanol.

(b) Following the procedure according to paragraph (a) but using 21.3 g. of N-(5-nitro-2-thiazolyl)cyclopropanecarboxamide, 4.63 g. of the sodium hydride in mineral oil and 9.65 g. of 2-chloroethanol, the product obtained is N - [3 - (2 - hydroxyethyl)-5-nitro-4-thiazolin-2-ylidene]cyclopropanecarboxamide; M.P. 169–171° C. from ethanol. To convert the product to the corresponding ester, trifluoroacetic acid, 2-{2-[(cyclopropylcarbonyl)imino] - 5 - nitro - 4 - thiazolin - 3-yl}ethyl ester, a mixture of the carboxamide (1.9 g.), 30 ml. of dry tetrahydrofuran and $(CF_3CO)_2O$ (1.62 g.) is allowed to stand 16 hours at 27° C. Upon adding isooctane (65 ml.), the product precipitates and is collected.

By the same procedure but using 25.2 g. of the propionamide, 5.28 g. of the sodium hydride suspension in mineral oil and 22.8 g. of bromoacetaldehyde dimethylacetal, the product is N-[3-formylmethyl)-5-nitro-4-thiazolin - 2 - ylidene] - 2,2 - dimethylpropionamide, dimethylacetal; M.P. 92–94° C. from cyclohexane.

By the same procedure but using 25.2 g. of the propionamide, 6.25 g. of sodium hydride dispersion in mineral oil, and 19.8 g. of 1-bromo-2-propanol, the product is N-[3-(2-hydroxypropyl) - 5-nitro-4-thiazolin-2-ylidene]-2,2-dimethylpropionamide; M.P. 155.5–158° C. from 2-propanol.

EXAMPLE 10

(a) A 57% dispersion of sodium hydride (5.1 g.) in mineral oil is added to a stirred solution of 29.0 g. of 3-chloro - 2,2 - dimethyl - N-(5-nitro-2-thiazolyl)propionamide in 75 ml. of N,N-dimethylformamide maintained at 5–10° C. The resulting solution is treated with 30.4 g. of 1-iodobutane and stirred overnight at room temperature. The mixture is diluted with 500 ml. of toluene and the resulting solution washed with water, dried and evaporated under reduced pressure. The residual oil is washed with isooctane, dissolved in ethanol and cooled to −60° C. The product which precipitates is N-(3-butyl-5-nitro-4-thiazzolin - 2 - ylidene) - 3 - chloro - 2,2 - dimethylpropionamide; M.P. 68–70° C. from cyclohexane. By this procedure starting with N-(5-nitro-2-thiazolyl)-1-phenylcyclobutanecarboxamide (4.8 g.), 0.76 g. 55% sodium hydride dispersion in mineral oil, and 3.7 g. of 1-iodobutane, the product is N-(3-butyl-5-nitro-4-thiazolin-2-ylidene)-1-phenylcyclobutanecarboxamide; M.P. 70–72° C. from isopropanol.

(b) The propionamide starting material for the procedure of paragraph (a) can be prepared as follows; thionyl chloride (96.4 g.) is added to 109 g. of 3-chloro-2,2-dimethylpropionic acid in 300 ml. of chloroform. The mixture is allowed to stand overnight and is then heated under reflux for several hours. The solvent is removed under reduced pressure and the residual oil added to a mixture of 96.6 g. of 2-amino-5-nitrothiazole, 63.2 g. of pyridine and 500 ml. of tetrahydrofuran. The resulting mixture is heated to 50° C., 350 ml. of acetonitrile is added and the mixture is then held at 50° C. for 2 hours and finally filtered. The filtrate is concentrated by removal of solvent under redeuced pressure and the residual solid is washed with toluene. This product is 3-chloro-2,-dimethyl-N-(5-nitro-2-thiazolyl) propionamide; M.P. 116–118° C. after recrystallization from aqueous 2-propanol and toluene.

The carboxamide for the above procedure can be prepared as follows: A solution of 29.0 g. of 1-phenylcyclobutanecarboxylic acid, 0.9 ml. pyridine, 12.8 ml. of thionyl chloride, and 150 ml. of chloroform is stirred overnight at room temperature, and heated slowly to reflux temperatture. After 3 hours under reflux, the evolution of gases ceases and the mixture is concentrated on a rotatory evaporator. The residual acid chloride is dissolved in 60 ml. of tetrahydrofuran and added to a solution of 21.8 g. of 2-amino-5-nitrothiazole in 250 ml. of tetrahydrofuran at 5° C. this is followed by 23 ml. of triethylamine. The mixture is kept at 5° overnight, filtered, and evaporated to 60 g. of an oily product which is dissolved in chloroform and purified by passage over a chromatographic column of silica gel. After removal of solvent and recrystallization from ethyl acetate, N-(5-nitro-2-thiazolyl)-1-phenylcyclobutanecarboxamide is obtained as yellow crystals, M.P. 143–145.5° C.

EXAMPLE 11

A 57% dispersion of sodium hydride (7.9 g.) in mineral oil is added to a stirred mixture of N-(5-nitro-2-thiazolyl)-2,2-dichloroacetamide (43.8 g.) [J. Pharm. and Pharmacol., 7, 112–17 (1955)] in 110 ml. of N,N-dimethylformamide maintained at 5–10° C. The resulting solution is warmed to 20° C., 39.4 g. of 1-iodobutane is added and the mixture is stirred at room temperature for 48 hours. A toluene solution of the reaction mixture is washed with water, dried and evaporated under reduced pressure. The residual product is washed with isooctane, dissolved in chloroform and the chloroform solution purified chromatographically on a column of activated alumina. The product is N-(3-butyl-5-nitro-4-thiazolin-2-ylidene-2,2-dichloroacetamide; M.P. 65–67° C. after recrystallization from 2-propanol.

EXAMPLE 12

(a) Red fuming nitric acid (5.2 ml.) is added dropwise with stirring over a period of 1.5 hours to a solution of N-(3-isopentyl-4-thiazolin - 2 - ylidene)-2,2-dimethylpropionamide (25.4 g.) in 60 ml. of concentrated sulfuric acid maintained at −4 to −8° C. The resulting mixture is stirred for 2 hours while allowing the temperature to rise from −5 to 25° C. and is then poured into 1.5 liters of ice and water. The precipitate which forms is collected, washed with water and dissolved in toluene. The toluene solution is washed with water, dried and evaporated. The residual product is N-(3-isopentyl-5-nitro-4-thiazolin-2-ylidene)-2,2-dimethylpropionamide; M.P. 60–61° C. after recrystallization from isooctane and 95% ethanol.

(b) The propionamide starting material for the procedure of paragraph (a) can be prepared as follows: a solution of 2-aminothiazole (30 g.) and 1-bromo-3-methylbutane (50 g.) in 2-propanol (100 ml.) is heated at reflux temperature for 30 hours and is then evaporated to dryness at reduced pressure. The residue is washed with ether and then crystallized from acetonitrile to give 2-imino-3-isopentyl-4-thiazoline hydrobromide; M.P. 139–141° C. The product is dissolved in 200 ml. of water and the solution basified by the addition of 15 ml. of 50% aqueous sodium hydroxide. The basic solution is extracted with ether, the ether extracts are washed with water, dried and evaporated to give 2-imino-3-isopentyl-4-thiazoline as an oil. The product in the amount of 22.5 g. and triethylamine (19.0 ml.) as a solution in 150 ml. of tetrahydrofuran are added over a 2 hour period to a stirred solution of pivaloyl chloride (17.0 ml.) in tetrahydrofuran (300 ml.) maintained at 0–5° C. The resulting mixture is stirred for 3 hours while allowing the temperature to rise from 5–25° C. and the mixture is filtered to remove triethylamine hydrochloride. The filtrate is evaporated to dryness, the residual oil is dissolved in 400 ml. of ether and the ether solution is washed with water, dried and evaporated to provide N-(3-isopentyl-4-thiazolin-2-ylidene) - 2,2 - dimethylpropionamide; M.P. 62–63.5° C. after crystallization from isooctane.

EXAMPLE 13

(a) N-{5-nitro-3-[2-(triphenylmethoxy)ethyl] - 4 - thiazolin-2-ylidene}cyclopropanecarboxamide (0.5 g.) and 80% acetic acid (15 ml.) are heated at 95° C. for 1.5 hours and the resulting solution cooled to precipitate triphenylcarbinol. The mixture is diluted with water whereupon the product separates out and is collected and washed with toluene. The product is N-[3-(2-hydroxyethyl)-5-nitro-4-thiazolin - 2 - ylidene] - cyclopropanecarboxamide; M.P. 168–171° C.

(b) The carboxamide starting material for the procedure of paragraph (a) can be prepared as follows: a 57% dispersion of sodium hydride (9.25 g.) in mineral oil is added to a stirred solution of N-(5-nitro-2-thiazolyl)cyclopropanecarboxamide (42.6 g.) in N,N-dimethylformamide (225 ml.). 2-chloroethyltriphenylmethyl ether (71.0 g.) is added to the resulting solution at 50° C. and the mixture is stirred for 24 hours at 80° C. and for 4 hours at 90° C. About 100 ml. of solvent is removed under reduced pressure, the residual mixture is filtered and the filtrate is diluted to a volume of 1 liter with toluene. This solution is washed with water, dried and evaporated to provide N - {5-nitro-3-[2-(triphenylmethoxy)ethyl]-4-thiazolin-2-ylidene}-cyclopropanecarboxamide; M.P. 202–204° C. after recrystallization from toluene.

EXAMPLE 14

(a) To a solution of 25.6 g. of N-(5-nitro-2-thiazolyl) cyclopropanecarboxamide in 75 ml. of N,N-dimethylformamide maintained at 5–10° is added 5.76 g. of a 55% dispersion of sodium hydride in mineral oil. The resulting solution is warmed to 25°, and 23.4 g. of 2-bromoethyl acetate is added. The mixture is stirred overnight at 25°, then heated at 80° for 30 minutes. The resulting mixture, cooled to room temperature, is diluted with 500 ml. of toluene, washed with water, dried over magnesium sulfate, and the solvent removed under reduced pressure. The residue is washed with isooctane, and crystallized from 30 ml. of isopropyl alcohol. The crystalline precipitate is removed by filtration. The product, N-[3-(2-hydroxyethyl)-5-nitro-4-thiazolin - 2 - ylidene]cyclopropanecarboxamide, acetate ester, separates as a precipitate from the filtrate, M.P. 119.5–121.5° C., when recrystallized from toluene and from ethanol.

(b) The carboxamide starting material can be prepared as follows: With stirring, 25 g. of cyclopropanecarbonyl chloride is added dropwise over a period of 1 hour to a suspension of 24 g. of 2-aminothiazole and 19.3 ml. of pyridine in 120 ml. of benzene. During the addition, the temperature rises from room temperature to approximately 53° C. and a solid product precipitates. The mixture is allowed to stand overnight and the solid product is collected on a filter, suspended in cold water, again collected on a filter, and dried. It is N-(2-thiazolyl)cyclopropanecarboxamide, M.P. 163–164.5° C. following crystallization from isopropyl alcohol.

A solution is prepared by dissolving 5 g. of N-(2-thiazolyl)cyclopropanecarboxamide in 15 ml. of concentrated sulfuric acid at 0° C. With stirring and external cooling to maintain the temperature at 0° C., 1.74 ml. of fuming nitric acid is added dropwise over a period of 1 hour. The resulting mixture is stirred and allowed to warm to room temperature over a period of 3 hours and then poured into ice water. The insoluble product is collected, washed with water, and dried. It is N-(5-nitro-2-thiazolyl) cyclopropanecarboxamide, M.P. 235–237.5° C. following crystallization from ethyl acetate-isooctane.

EXAMPLE 15

(a) To a stirred solution of 18.7 g. of 2-ethyl-2-methyl-N-(5-nitro-2-thiazolyl)butyramide in 40 ml. of N,N-dimethylformamide, at 5–10°, is added 3.52 g. of a 55% dispersion of sodium hydride in mineral oil. The resulting solution is heated to 80°, and 20.2 g. of 2-methoxyethyl-p-toluenesulfonate is added during 5 minutes. The mixture is allowed to cool to room temperature, diluted with 250 ml. toluene, washed with water, and dried over magnesium sulfate. The solvent is removed under reduced pressure and the residue is washed with isooctane, dissolved in chloroform and purified by passage over a chromatograph column of silica gel. The eluate is concentrated and crystallized from ethyl alcohol with cooling to −60°. Recrystallization from isooctane provides 3-ethyl-N-[3-(2-methoxyethyl) - 5 - nitro - 4 - thiazolin - 2 - ylidine]-2-methylbutyramide, M.P. 45–46° C.

(b) The starting material for paragraph (a) is prepared as follows: To a stirred solution of 50 g. of 2-ethyl-2-methyl-butyric acid in 300 ml. of benzene and 0.3 ml. of pyridine is added 98 g. of oxalyl chloride over a period of 2 hours. The mixture is allowed to stand overnight, then heated slowly to reflux temperature, refluxed for 30 minutes, cooled, and evaporated under reduced pressure.

The residue of acid chloride (54.3 g.) is added to a suspension of 48 g. of 2-amino-5-nitrothiazole in 450 ml. of tetrahydrofuran at 5° C., followed by 51 ml. of triethylamine. The resulting mixture is stored under refrigeration overnight, filtered, and the solvent removed under reduced pressure. The residue, dissolved in chloroform, is washed with water, filtered, dried over magnesium sulfate, and purified by passage over a chromatographic column of silica gel. The product, 2-ethyl-2-methyl-N-(5-nitro-2-thiazolyl)butyramide, is obtained by concentrating the eluate, M.P. 149–150.5° C. after crystallization from 95% ethanol.

I claim:

1. A compound of the formula

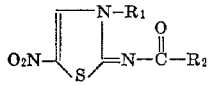   I where $R_1$ is $C_2$ to $C_8$ alkyl, methoxy- or ethoxy-substituted $C_1$ to $C_4$ alkyl, ω,ω-dimethoxy-substituted $C_2$ to $C_4$ alkyl, $C_2$ to $C_4$ hydroxyalkyl, propynyl, allyl, benzyl, acetoxyethyl, trifluoroacetoxyethyl, or methylthioethyl, and $R_2$ is methyl, $C_4$ to $C_8$ t-alkyl, $C_4$ to $C_8$ t-chloroalkyl, $C_3$ to $C_5$ cycloalkyl, $C_1$ to $C_3$ 1-alkyl-substituted $C_3$ to $C_5$ cycloalkyl, 1-adamantanyl, 1-phenylcyclopropyl, 1-phenylcyclobutyl, or 1,1-dichloro-substituted $C_1$ to $C_6$ alkyl.

2. A compound according to claim 1 which is N-(5-nitro - 3 - propyl - 4 - thiazolin - 2 - ylidene)cyclopropanecarboxamide.

3. A compound according to claim 1 which is N-(3-butyl - 5 - nitro - 4 - thiazolin - 2 - ylidene)cyclopropanecarboxamide.

4. A compound according to claim 1 which is N-[3-(2-hydroxyethyl) - 5 - nitro - 4 - thiazolin - 2 - ylidine] cyclopropanecarboxamide.

5. A compound according to claim 1 which is N-[3-(2-methoxyethyl) - 5 - nitro - 4 - thiazolin - 2 - ylidene] cyclopropanecarboxamide.

6. A compound according to claim 1 which is N-[3-isopentyl - 5 - nitro - 4 - thiazolin - 2 - ylidene]cyclopropanecarboxamide.

7. A compound according to claim 1 which is N-[3-(2 - methoxyethyl) - 5 - nitro - 4 - thiazolin - 2 - ylidene]-2,2-dimethylpropionamide.

8. A compound according to claim 1 which is N-[3-(ethoxymethyl) - 5 - nitro - 4 - thiazolin - 2 - ylidene]-2,2-dimethylpropionamide.

9. A compound according to claim 1 which is N-(3-benzyl - 5 - nitro - 4 - thiazolin - 2 - ylidine)-2,2-dimethylpropionamide.

10. A compound according to claim 1 which is N-(3-allyl - 5 - nitro - 4 - thiazolin - 2 - ylidene)-2,2-dimethylpropionamide.

References Cited

UNITED STATES PATENTS 3,311,614   3/1967   Capps _____ 260—306.8

R. J. GALLAGHER, Assistant Examiner

ALEX MAZEL, Primary Examiner

U.S. CL. X.R.

260—306.8; 424—270